Nov. 4, 1958

M. WEIDIG 2,859,295

ZERO SPEED MECHANISM

Filed May 27, 1957

INVENTOR.
MILES WEIDIG.
BY
Edward J. Utz
ATTORNEY.

Nov. 4, 1958    M. WEIDIG    2,859,295
ZERO SPEED MECHANISM
Filed May 27, 1957    2 Sheets-Sheet 2

INVENTOR.
MILES WEIDIG.
BY
ATTORNEY.

United States Patent Office 2,859,295
Patented Nov. 4, 1958

2,859,295

ZERO SPEED MECHANISM

Miles Weidig, Cincinnati, Ohio, assignor to The Carlton Machine Tool Company, Cincinnati, Ohio, a corporation of Ohio Application May 27, 1957, Serial No. 661,729

7 Claims. (Cl. 200—80)

My invention relates to a mechanism designed to trip a mercury switch which is mounted within a machine tool such as a clutch gear cap.

In particular, my invention is designed to cause a switch to be operated when the speed of a shaft is reduced to a speed of rotation approaching zero. Heretofore, it has been extremely difficult to measure and to cause a switch mechanism to become operative when a shaft in its revolutions approaches zero in its speed.

In my invention I provide a device whereby as the rotation of a shaft approaches zero a mechanism is caused to operate, to cause a switch to be tripped. Such a device is important in industry for the reason that other devices associated with the mechanism cooperating with the tripping mechanism, are operable at predetermined intervals of time in the operation of the general mechanism. Also in view of modern designs it is desirable to actuate automatically certain shift devices. This is accomplished by utilizing shaft speed which must be accurately measured in time.

The point in time where my invention is particularly useful is that time when the shaft speed is approximately 5 R. P. M. and is decelerating.

The principal object of my invention is to provide a mechanism so sensitive that the reduction of the speed of a shaft as it approaches zero will actuate other mechanism to trip a switch at the instant that the speed of the shaft is reduced to zero.

Another object of my invention is the provision of a mechanism so designed and constructed that it is sensitive to the revolutions of a given decelerating shaft connected to its operative parts.

Another object of my invention is the provision of a mechanism, so designed that the driving shaft may be directly connected to the measuring shaft, and as the speed of the driving shaft approaches zero speed, tripping devices connected to said measuring shaft will be operable.

Another object of my invention is the provision of a device for tripping a selected mechanism as a selected shaft approaches zero which device is so designed that ordinary speeds will not damage said mechanism.

Another object of my invention is the provision of a device for tripping selected switches which does not involve direct connection with the driving device which measures the interval at which the tripping is accomplished.

Another object of my invention is the provision of a mechanism having an inclined plane which is susceptible of receiving in a track formed thereon weights which as a shaft approaches its last revolution to zero cause the tripping of an associated device.

Another object of my invention is the provision of a mechanism in which the associated device is a mercury switch.

Still another object of my invention is the provision of a mechanism in which the forces employed to attain the shifting of the mechanism as the speed of a selected interconnected shaft approaches zero are mechanical.

A further object of my invention is the provision of a shifting device which is sensitive to the movement of a steel ball within a track interconnected with a driving member which shifting device is operable as the driving member approaches the speed of zero during its penultimate revolution.

In the structure which I illustrate in this application for patent, I provide a driving rod to which is keyed a lower driving rod. At its lower end the lower driving rod has threaded holes to which is secured a ball guide which cooperates with a tilt bar to actuate the movement of a mercury switch.

In my invention I provide a ball guide which is provided with a raceway in which a steel ball is moved when a selected shaft approaches its zero speed causing a switch to be tripped. A mechanism which would employ a zero speed device such as illustrated in the accompanying drawings would normally consist of a take-off shaft, running at the same speed as the shaft that cooperates with the working mechanism. As an example it could be a shaft coupled to a pump rotor of a conventional valve bypass pump or, it might be utilized in connection with a pump having a source of oil at all times, which source of oil comes from inside lubricators. On the other hand, it might be used to close a hydraulic circuit, with a relief valve to allow circulation of a cooperating, high pressure pump.

With the use of my invention we are able to pump oil under pipe pressure while a shaft is turning, and we are able to utilize oil under pressure against a device to open a limit switch and hold it open so that a shaft may be moved. I am able with my invention to open a relief valve to permit the pressure in pipes to be reduced, to allow a diaphragm to move to allow a switch to be closed by the utilization of a small orifice.

In general, my invention comprises a rotatable shaft, having connected thereto a raceway rotatable with said shaft, and provided with a plurality of steel metallic balls which are adapted to be moved under certain conditions within said raceway, to cause the tripping of a switch.

The switch which I provide is generally of the mercury type. The raceway is provided with a series of lands wherein, upon the reduction of speed a shaft rotatable in the same direction as the raceway causes the metallic balls to slide down this raceway to trip a switch.

My invention is illustrated in the accompanying drawings in which the same reference numerals refer to the same parts throughout and in which.

Figure 1:
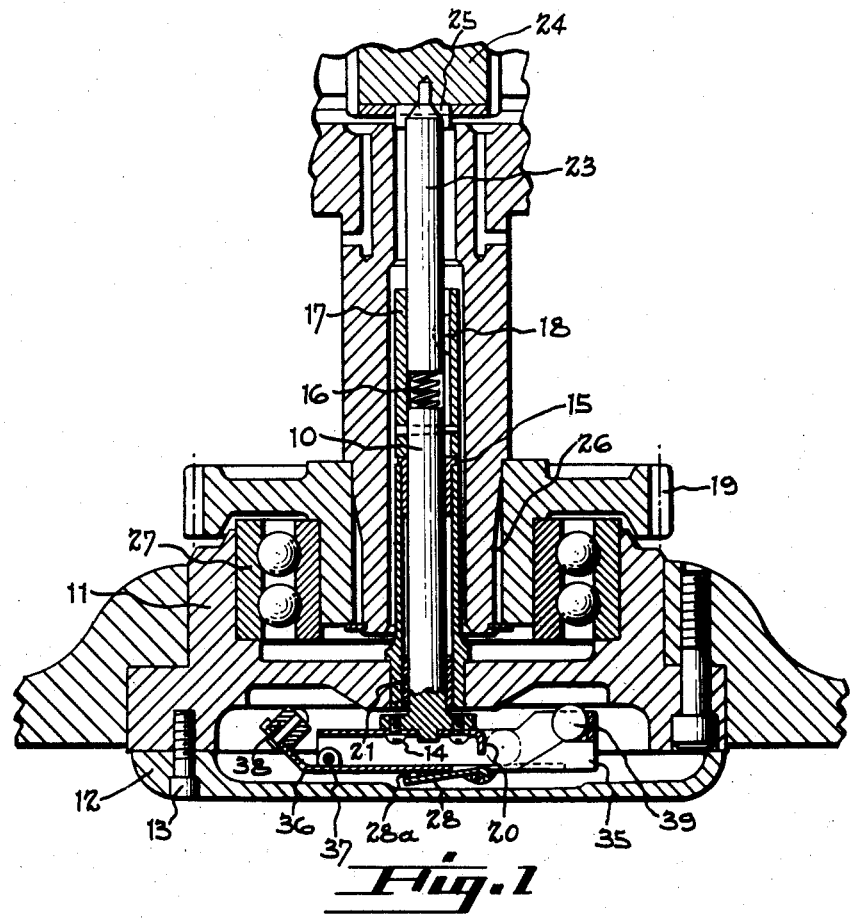
Fig. 1 is a view in section of the structure forming my invention.

I provide a lower shaft 10 having a minimum running shaft speed of approximately 100 R. P. M. This shaft is mounted within a clutch gear cap 11. The clutch gear cap 11 has affixed thereto a cover 12 adapted to enclose the tripping mechanism designed for tripping the mercury switch. The clutch gear cap cover is secured to the cap by means of bolts such as 13. The shaft 10 mounted within the gear cap 11 is driven by shaft 24 through shaft 23. The shaft 10 runs within the Oilite bearing 21 at the portion of said shaft adjacent to the tripping mechanism to be described. The shaft is rotatable within the bearings 21 and 15.

The shaft is coupled to the upper shaft 23 by means of a spring coupling 16 cooperating with coupling member 17 aligned to shaft 23 by means of a Woodruff key 18. The upper shaft is keyed to a driving member 24 by means of key 25.

Figure 2:
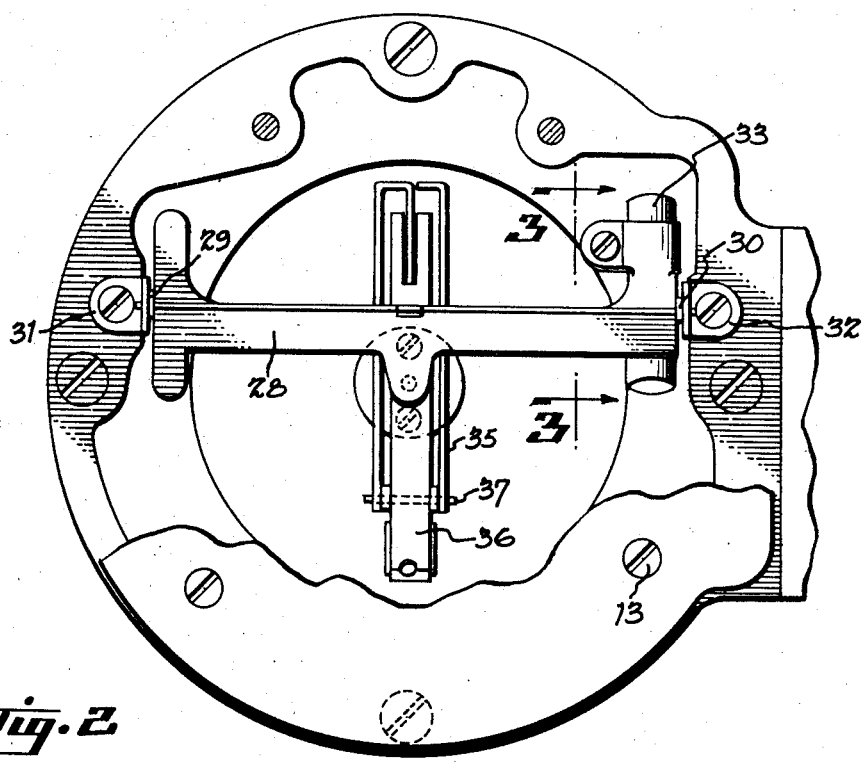
Fig. 2 is a plan view showing the invention.
Figure 5:
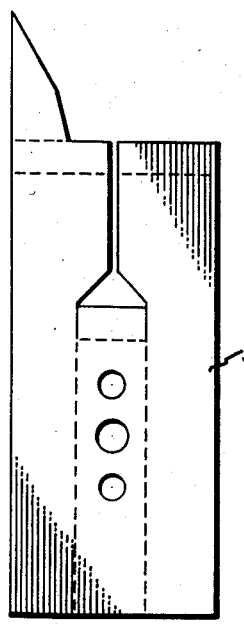
Fig 5 is a view of the plate which is formed into the ball guide
Figure 4:
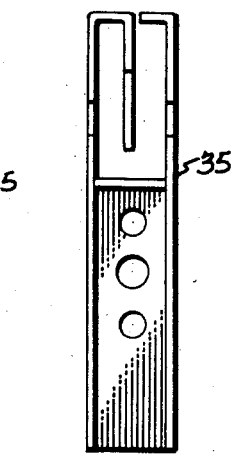
Fig. 4 is a view of the ball guide.
Figure 3:
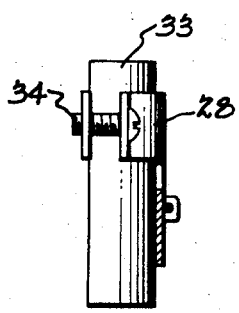
Fig. 3 is a view taken along the line 3—3 of Fig. 2.

The tripping mechanism comprises a tilt bar 28 (Fig. 2) which is provided with ends 29 and 30 which are tiltable within pivot members 31 and 32 secured to the gear cap 11. The mercury switch 33, is secured to the tilt bar 28 and securely held by means of a screw 34 (Fig. 3).

The ball guide 35 is secured by means of screws to the end of lower shaft 10. A trigger 36 is hinged to the ball guide 35 by a pin 37. The trigger 36 has at one end a weight 38 which acts as a counterbalance.

The ball guide 35 is shaped at the end opposite the end carrying the counterweight 38 so that a raceway is provided for the movement of the ball 39 which descends from the horizontal along a 10 degree projection and then subsequently to a 30 degree projection. The ball is held at the extreme edge portion of the ball guide by centrifugal force. As the speed of rotation of the shaft approaches zero the ball descends along a 10 degree slope then along a 30 degree slope to a horizontal position to actuate the trigger mechanism.

The movement of the steel ball causes the trigger mechanism to function as the speed of the shaft approaches zero. As the speed of the driving shaft approaches zero the ball 39 descends along the inclined plane within the ball guide 35 causing the trigger mechanism 36 to be operable about its pivot 37 on the ball guide 35 to tilt the tilt bar 28 which is pivotally mounted within gear cap 11, to tilt the mercury switch 33. Thus the instant zero speed is reached, the ball 39 will have descended in the ball guide 35 so that the mercury switch 33 will be operative the instant the shaft ceases to rotate.

It is to be noted that the ball guide mechanism 35 is fixed to and rotates at the end of the shaft 10 but the tilt bar 28 is pivotally held in its one position within the gear cap 11. Centrifugal force keeps the ball 39 at the outermost portion of the ball guide and as the shaft 10 decelerates the weight of the ball against the stop 20 causes the tilt bar 28 to be moved when the weight of the ball guide is forced down against the button 28a provided on the tilt bar.

Having thus described my invention, what I claim is new and useful and desire to secure by Letters Patent is:

1. A device for determining the time at which the speed of rotation of a shaft in a machine tool approaches zero, comprising a driving shaft, a driven shaft keyed to said driving shaft, a ball guide connected to said driving shaft, a ball movable within said guide, a trigger mechanism pivotally mounted on said ball guide, a tilt bar actuated by said trigger mechanism, a switch connected to said tilt bar which is operated when said ball is moved within said ball guide to operate said trigger mechanism to thereby move said tilt bar.

2. A device for determining the time at which the speed of rotation of a shaft approaches zero, comprising a drive shaft, a second shaft keyed to said drive shaft, a ball guide fastened to one end of said second shaft, a trigger device pivotally mounted on said ball guide, said ball guide provided with an inclined plane surface along which said ball will move, a tilt bar operable in response to the movement of said trigger device, a mercury switch connected to said tilt bar, whereby the switch is tilted when said ball moves along said inclined plane as the speed of rotation of said second shaft approaches zero.

3. A device connected to a shaft for tripping a switch of the mercury type comprising a ball guide secured to the end of said shaft, a tilt bar pivoted to said ball guide, a ball movable within said ball guide along an inclined plane to a horizontal plane normal to the axis of said shaft, a tripper mechanism connected to said ball guide, said trigger mechanism being provided with a counterweight, a mercury type tiltable switch connected to said tilt bar which is movable to tilt position by said trigger mechanism as said trigger mechanism is actuated by the movement of the ball as the speed of the shaft approaches zero.

4. A tripping device connected to a rotatable shaft comprising a ball guide secured to the end of said shaft, a ball guide having a cage portion at one of its ends, a ball, a raceway within said ball guide along which said ball is movable from an ineffective position during the normal movement of said rotatable shaft to an effective position when said shaft reaches its penultimate revolution, a trigger mechanism mounted within said ball guide comprising a trigger pivoted to the base portion of said ball guide at a point adjacent to the edge portion of an inclined portion of said raceway, a tilt bar operable by the movement of said trigger, and a mercury tilt-type switch connected to said tilt bar operable upon the movement of said trigger.

5. A device for determining the time at which the speed of rotation of a shaft in a machine tool aproaches zero, comprising a ball guide connected to one end of said shaft and revoluble in a plane normal to the axis of said shaft, a ball carried within said ball guide, an inclined surface along the outer portion of said ball guide along which said ball is slid, a trigger pivoted along the base portion of said ball guide adjacent to the edge of said inclined surface, a counterweight connected to the other end of said trigger, a tilt bar tiltable upon the movement of said ball in said ball guide whereby said trigger mechanism is actuated to thereby trip a switch connected to said tilt bar which tripping is effective as the speed of said shaft approaches zero.

6. A device for tripping a switch as the speed of rotation of a machine tool shaft approaches zero, comprising a tilt bar pivoted within a housing and lying in a plane normal to the axis of rotation of said shaft, a mercury tilt-type switch connected to said tilt bar, a tripping mechanism connected to said shaft and interconnected to said tilt bar, said tripping mechanism comprising a ball guide, a ball slidable in said guide, said ball slidable when the speed of said shaft is reduced to zero to effectuate the movement of said tilt bar about its pivoted connection in said housing to effectuate the movement of the switch.

7. A device for measuring the speed of rotation of a driven shaft in a machine tool, said device comprising a ball guide secured to the end of said driven shaft, a ball carried within said ball guide, said ball maintained at the edge portion of said ball guide when said shaft is rotated, an inclined plane within said ball guide along which said ball is slid when said shaft is reduced to a speed approaching zero, and a trigger pivotally connected to said ball guide, a tilt bar operated to a tilt position when said trigger is pivoted by the movement of said ball, a switch connected to said tilt bar to be effective when the speed of said shaft is reduced to zero speed.

References Cited in the file of this patent

UNITED STATES PATENTS

| 606,076 | Ovenden | June 21, 1898 |
| 683,213 | Mansfield et al. | Sept. 24, 1901 |
| 2,187,202 | Henry | Jan. 16, 1940 |
| 2,359,623 | Coxon | Oct. 3, 1944 |

FOREIGN PATENTS

| 707,336 | Great Britain | Apr. 14, 1954 |